United States Patent [19]
Zornes

[11] Patent Number: 5,149,208
[45] Date of Patent: * Sep. 22, 1992

[54] BEARING WITH LUBRICATING AND NON-LUBRICATING SPACERS

[75] Inventor: David A. Zornes, Redmond, Wash.

[73] Assignee: Balanced Engines, Inc., Tacoma, Wash.

[*] Notice: The portion of the term of this patent subsequent to Aug. 20, 2008 has been disclaimed.

[21] Appl. No.: 745,267

[22] Filed: Aug. 14, 1991

Related U.S. Application Data

[63] Continuation-in-part of Ser. No. 503,526, Apr. 2, 1990, Pat. No. 5,040,906.

[51] Int. Cl.⁵ .................... F16C 19/40; F16C 33/66
[52] U.S. Cl. ..................................... 384/551; 384/470
[58] Field of Search .............. 384/470, 551, 572, 573, 384/576, 578, 463, 520, 51

[56] References Cited

U.S. PATENT DOCUMENTS

| | | | |
|---|---|---|---|
| 2,008,378 | 7/1935 | Witte | 384/551 |
| 2,946,633 | 7/1960 | Göthberg | 384/576 |
| 3,362,762 | 1/1968 | Haller | 384/572 |
| 4,797,011 | 1/1989 | Saeki et al. | 384/470 X |
| 4,906,110 | 3/1990 | Van Wyk et al. | 384/551 X |
| 5,040,906 | 8/1991 | Zornes | 384/551 |

*Primary Examiner*—Thomas R. Hannon
*Attorney, Agent, or Firm*—Seed and Berry

[57] ABSTRACT

A bearing has a plurality of rolling elements in a raceway which are separated by lubricating spacer elements and non-lubricating spacer elements. The lubricating spacer elements are free to float between the rolling elements and can provide all of the lubrication for the bearing. The non-lubricating spacer elements may also be free to float between the rolling elements or can be provided by a cage.

13 Claims, 3 Drawing Sheets

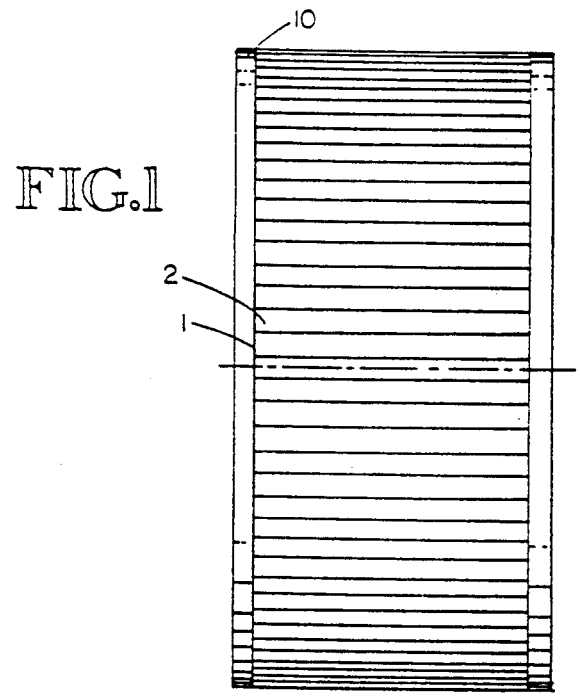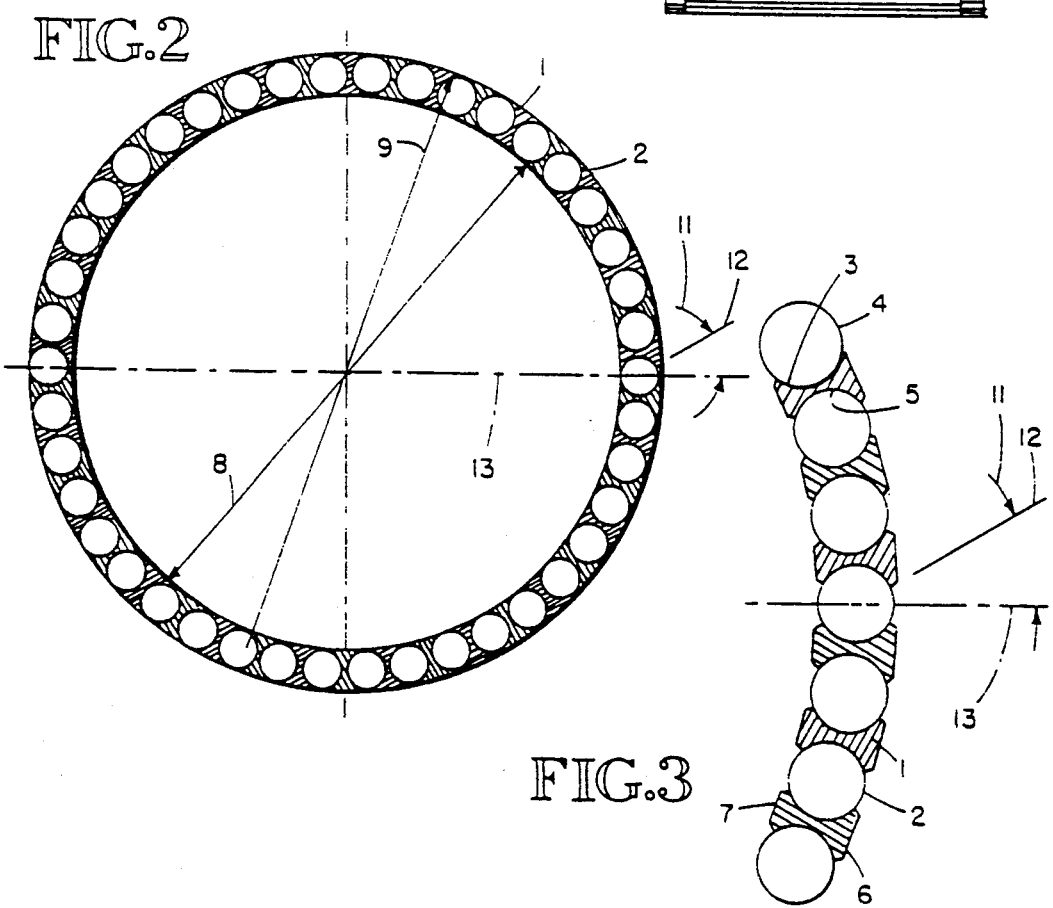

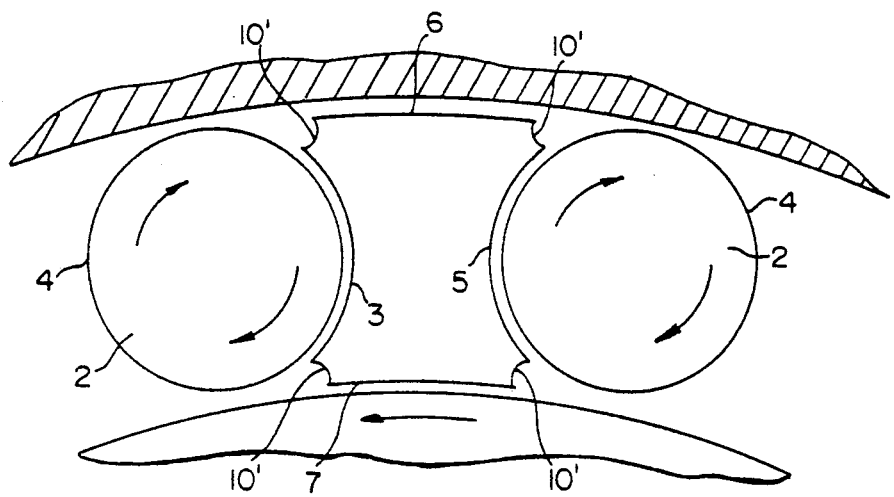
FIG. 6
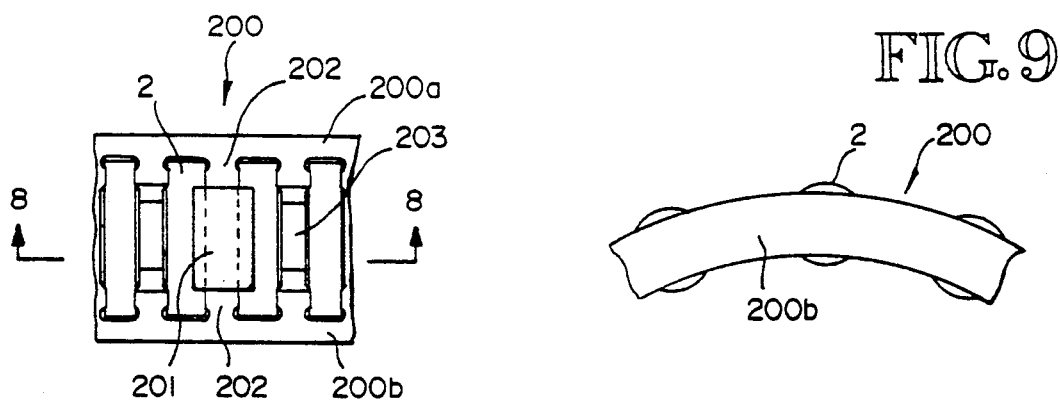
FIG. 9
FIG. 7
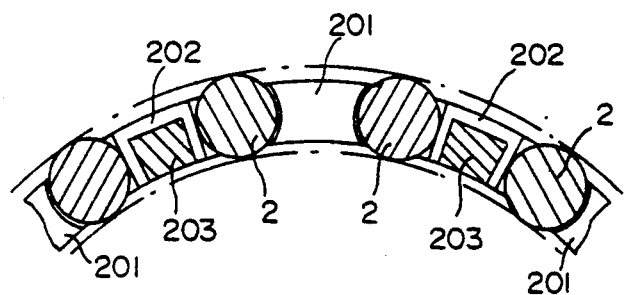
FIG. 8

BEARING WITH LUBRICATING AND NON-LUBRICATING SPACERS

This application is a continuation-in part of copending application Ser. No. 07/503,526 filed Apr. 2, 1990 U.S. Pat. No. 5,040,906.

TECHNICAL FIELD

This invention relates to self-lubricating bearings of the type in which the roller elements are lubricated by lubricant transfer from spacers containing lubricants.

BACKGROUND OF THE INVENTION

U.S. Pat. No. 4,906,110 discloses an improved solid lubricant roller bearing in which the rollers are separated by floating lubricating spacers. The present invention aims to increase the life and stability of this type of bearing.

SUMMARY OF THE INVENTION

In accordance with the present invention, lubricating and non-lubricating spacer elements are positioned between the rollers to provide solid lubricant and stability, respectively, for the rollers. The non-lubricating spacer elements primarily have only a spacing function, although they may be of a material which has favorable anti-friction characteristics. The lubricating elements are floating and the non-lubricating elements may be floating or part of a cage. When provided as floating elements the non-lubricating elements are preferably alternated with the lubricating spacer elements in an arrangement placing each non-lubricating spacer element opposite a lubricating spacer element so that the race engaging portion of the rollers is lubricated by direct contact with the lubricating spacer elements as the rollers turn. The non-lubricating spacers assist in spreading the lubricant on the rollers and provide roller stability to the extent not provided by the lubricating spacers. In an arrangement whereon the non-lubricating spacers are floating elements it is preferred to provide a pair of non-lubricating end spacers adjacent the ends at one side of each roller and a central non-lubricating spacer opposite its other side. When a cage provides the non-lubricating spacers a substantial central portion of each roller is opposed on opposite sides by lubricating spacer elements.

BRIEF DESCRIPTION OF THE DRAWINGS

FIG. 1 is an exterior side view of a typical assembly of spacer and roller elements to which the invention is applicable;

FIG. 2 is an end view of the assembly with an annular end ring removed;

FIG. 3 is a detailed end view taken as in FIG. 2;

FIG. 6 is an alternate embodiment of a spacer for use with the rollers;

FIG. 7 is a fragmentary plan view of a second embodiment of the invention utilizing a cage;

FIG. 8 is a transverse sectional view taken as shown by lines 8—8 in FIG. 7; and FIG. 9 is a fragmentary end view of the second embodiment.

DETAILED DESCRIPTION OF THE INVENTION

Figure 4:
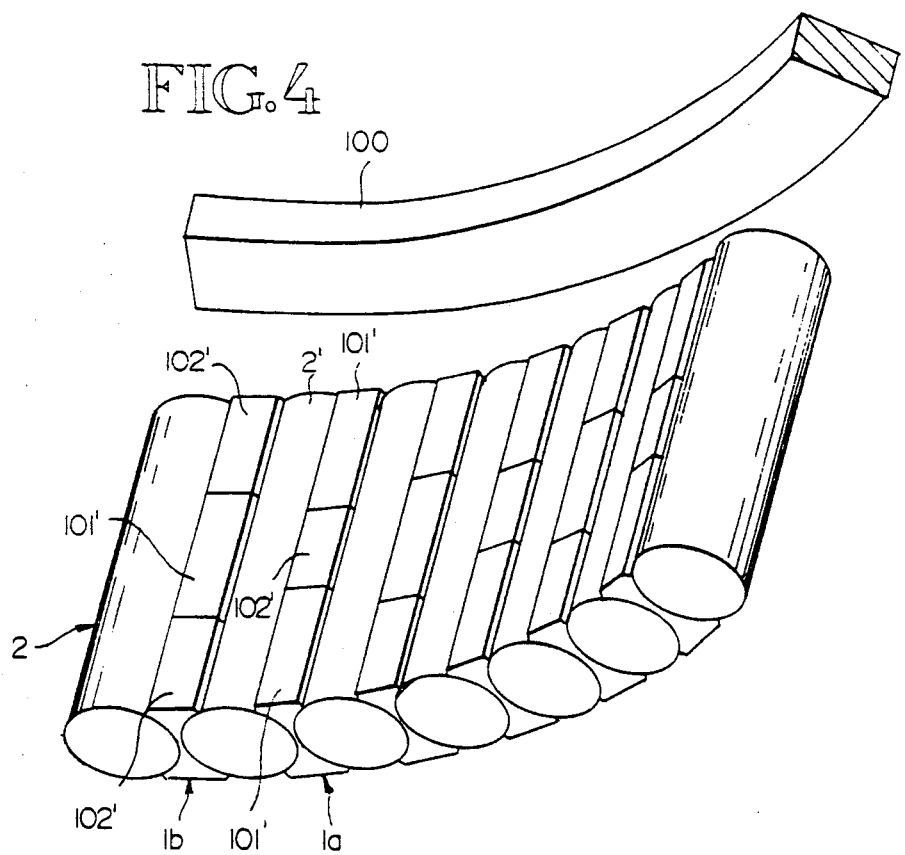
FIG. 4 is an isometric exploded view of a portion of a bearing constructed in accordance with the present invention.

Referring to FIGS. 1-2, floating spacers 1 having a solid lubricant composition separate an equal number of rolling needle elements 2. Each spacer 1 is preferably machined or molded to provide concave opposite sides 3, 5 with a curvature similar to the outer surface 4 of the needle rolling elements 2 to provide a relatively large initial contact area for solid lubricant transfer thereto. The outer and inner surfaces 6, 7 of the spacers 1 may be molded or machined with a convex curvature to conform, respectively, to that of the inner and outer raceways, as determined by diameters 8, 9, or the surfaces 6, 7 may be planar and have two-line contact along the longitudinal edges of outer surface 6 with the outer raceway and single-line tangential contact with the inner raceway midway between the longitudinal side edges of inner surface 7. End lubrication of the rolling elements 2 may be accomplished, for example, by annular rings 100 of solid lubricant material positioned adjacent the ends of the rollers 2 and spacers 1, or by end caps of solid lubricant material mounted on the ends of the rollers, or by end portions of the spacers arranged to overlap the ends of the rollers.

For cost economy it is preferred to form the spacers 1 by a high-pressure compaction and secondary sintering procedure precluding a need for follow-up machining. The joints at the meeting ends of adjoining spacer elements at opposite sides of each roller may be staggered endwise of the roller, so that each portion of the roller circumference will directly contact a spacer element during each roller rotation. This end can be accomplished, for example, by beveling the adjoining ends of the spacers to provide sloped end faces. By this arrangement the joint lines between respective spacer elements at opposite sides of a roller are staggered relative to one another along the roller.

Referring to FIG. 3, a recess 10 with angle 11 is preferably provided in the spacer elements along a plane 12 passing through the center axis of the adjoining rolling elements 2. This recess angle 11, as measured with respect to a plane 13 passing through the rotary axis of the bearing and the rotary axis of the adjoining rolling element, typically has a value of 30 degrees and will ensure that wear particles separated from the spacer are of minimum size so as not to interfere with the smooth operation of the bearing. The recess also serves to recapture small, loose wear particles of transfer lubricant and consolidate the particles back into the body of the spacer under the compressive action occurring between the rolling elements and the spacer with respect to the apex of the recess angle 11.

In an alternate embodiment of the spacer element 10, shown in FIG. 6, the recesses 10' are relieved so as to be substantially concave. This modification encourages wear particles to be captured in the recesses 10' rather than becoming entrapped between relative moving surfaces of the assembly.

In accordance with the present invention, non-lubricating spacers are also provided. It is preferred to alternate spacer elements containing solid lubricant substances ("lubricating spacer elements") with spacer elements which do not have lubrication as their principal function ("non-lubricating spacer elements") and preferably are more resistant to wear from roller contact. If both the lubricating and non-lubricating spacer elements are floating, they preferably are alternated in both the axial roller direction and circumferential direction of rotation of the entire bearing assembly. This arrangement maintains proper alignment and spacing of the roller elements by way of the non-lubricating spacers as the lubricating spacer segments are consumed. In this regard the initial clearances can be such that only the lubricating spacers contact the rollers until a preset amount of wear of the lubricating spacers has occurred.

Preferred materials for the "non-lubricating" spacer elements include, but are not limited to such hard wearing materials as ceramic materials, non-lubricated polymide materials, steel, silver impregnated bronze, phenolic materials, nylon, etc. The "non-lubricating" spacer elements may also be made from relatively soft materials such as Teflon ®, phenolic materials, nylon, etc. for low load conditions.

A basic arrangement of lubricating and non-lubricating spacer elements denoted 101 and 102, respectively, is shown in FIG. 4 for adjacent spacers. Spacer 1a, for example, has a pair of lubricating spacer elements 101 separated by a non-lubricating spacer element 102, whereas spacer 1b has a pair of non-lubricating spacer elements 102' separated by a lubricating spacer element 101'. Each of the lubricating spacer elements are preferably longer than the non-lubricating spacer elements so that the full length of the related roller will always be in contact with lubricating spacer elements. However, this arrangement is not essential because the lubricant spreads across the races and rollers responsive to rotation of the rollers.

The illustrated arrangement of alternating lubricating and non-lubricating spacers in FIG. 4 provides each roller (roller 2' for example) with two non-lubricating roller elements 102', adjacent its ends at one side of the roller, and with a central non-lubricating roller 102 at the other side of the roller. This assures stability to the rollers by the non-lubricating spacers.

Figure 5:
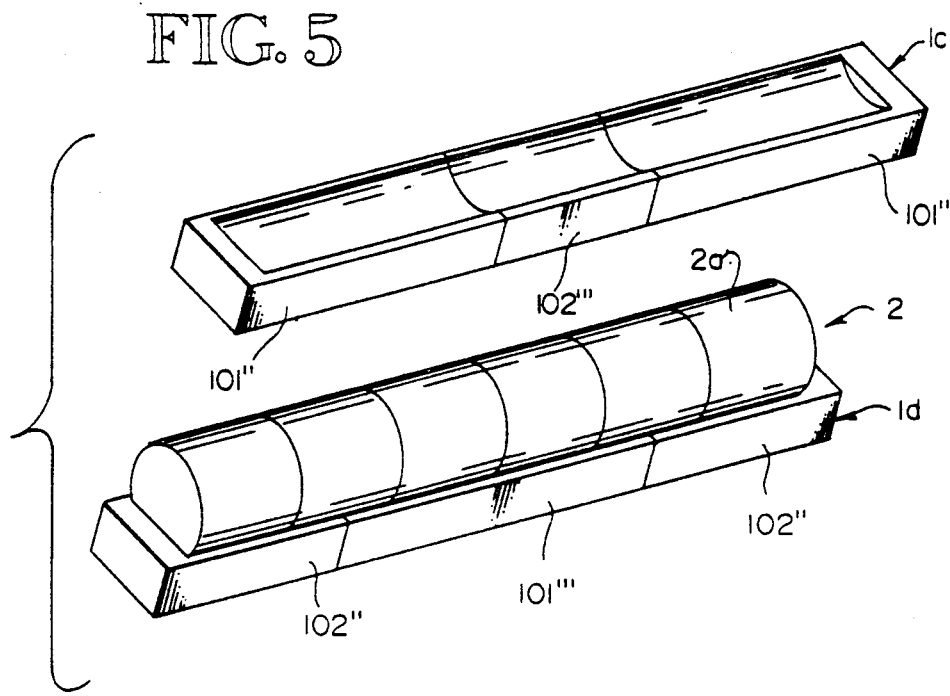
FIG. 5 is an exploded isometric view of a preferred spacer and roller configuration.

Referring to FIG. 5, the spacer 1c can provide end lubrication for the roller 2 by having the spacer ends cover the ends of the cavity with which the rollers interfit. Also, the rollers 2 can comprise a series of roller elements 2a placed end-to-end. As in the FIG. 4 example, non-lubricating spacer elements are alternated with lubricating spacer elements. At one side of the roller 2 spacer 1c has a pair of lubricating spacer elements 101" which are opposed by a shorter pair of non-lubricating spacer elements 102" in spacer 1d at the other side. Further, in spacer 1d center lubricating spacer element 101''' opposes a central non-lubricating spacer 102''' in spacer 1c.

In the embodiments shown in FIGS. 4 and 5, the spacers 1a–1d have been shown as each consisting of three spacer elements. It will be understood that there can be a greater number of spacer elements in each spacer, preferably an odd number of elements in each which are arranged so that (a) lubricating spacer elements alternate with non-lubricating elements in each spacer, and (b) lubricating spacer elements in each spacer are positioned opposite a non-lubricating spacer element in the adjacent spacers.

The lubricating spacer elements may be made from Vespel ® SP-21 polymide, a commercially available product produced by the DuPont Company having U.S. Military specification No. R46198. This product does not soften and is thermally resistant such that it can carry loads at temperatures beyond the reach of most plastic materials and do so while exhibiting very low creep. For example, when the product is subjected for 100 hours to loads of 2,500 psi at 572° F. the total deformation is only 1.2%. At the end of 600 hours under these load and temperature conditions the total deformation only increases to 1.6%. Vespel ® SP-21 has a polymide matrix containing a dispersion of various solid lubricant substances such as graphite and Teflon ®. The lubricating spacer elements are made by high-pressure compaction of Vespel ® powder and secondary sintering. The highest strength and lowest thermal expansion are usually found in the direction perpendicular to the pressing direction. Vespel ® SP-21 may be used for spacer elements to be used at lower temperatures. Initially there may be less tolerance provided between the lubricating spacer elements and the rollers than between the non-lubricating spacers and the rollers. After use has commenced, the lubricant from the lubricating spacer elements spreads over the rollers and the non-lubricating spacer elements.

Referring to FIGS. 7–9, the non-lubricating spacers may be provided by a cage 200 having end rings 200a, 200b from which non-lubricating spacer elements 202 project inwardly parallel to the axis of the bearing. Roller elements 2 have their opposite end portions positioned between circumferentially adjoining of the elements 202 and floating lubricating spacer elements 201 are located between the roller elements 2 and between the ends of the non-lubricating spacer elements 202. To tie the end rings 200a, 200b together some of the elements 202 at opposite sides are connected by connecting elements 203. These connecting elements 203 may be alternated circumferentially of the bearing with the lubricating spacer elements 201, or the connecting elements 203 can be at less intervals so that more lubricating spacer elements are provided. Needle roller elements are normally slightly tapered inwardly slightly toward the ends and so the race engaging portion of the roller elements is normally a central part of the length. Accordingly, the lubricating spacer elements 201 concentrate application of lubricant to the "working" part of the roller elements while the non-lubricating spacer elements 202 maintain the roller elements in proper alignment. However, during operation lubricant from the lubricating spacer elements normally migrates over the entire length of the roller elements.

Normally the cage 200 will be constructed of two halves which initially are flat. The roller elements and lubricating spacer elements can be loaded into the cage halves while they are flat, and then the cages are each bent into a semi-cylindrical shape. The cross-sectional shape of the transverse non-lubricating spacer elements of the cage can be made such as to retain the end portions of the roller elements after the cage halves have been bent into their final shape. The cage may be made of silver impregnated bronze or other suitable materials.

Although it is preferred to maximize the initial roller contact surface of the lubricating spacer elements, this is not essential. Accordingly, the lubricating spacer elements could have a square or trapezoidal transverse cross-section for example.

Although I have shown and described specific embodiments of my invention, it will be apparent that many minor changes of structure and operation could be made without departing from the spirit of the invention as defined by the scope of the appended claims.

I claim:

1. A bearing comprising:
   means providing a raceway;

a plurality of rolling elements in said raceway;

non-rolling spacer elements in said raceway between and closely adjacent to said rolling elements for maintaining a predetermined minimum spacing therebetween, said non-rolling spacer elements being arranged to be engaged by said rolling elements when maintaining said minimum spacing;

and lubricating spacer elements in said raceway between said rolling elements, said lubricating elements being free to float independently of said rolling elements and non-rolling spacer elements and being arranged so that each lubricating element can be engaged by the two adjoining of said rolling elements.

2. A bearing according to claim 1 in which said non-rolling spacer elements are free to float between said rolling elements.

3. A bearing according to claim 1 in which a cage provides said non-rolling spacer elements.

4. A bearing according to claim 1 in which said non-rolling spacer elements are located at both ends of said lubricating spacers.

5. A bearing according to claim 1 in which said lubricating spacer elements provide substantially all of the lubrication for the rolling surface of said rolling elements.

6. A bearing according to claim 1 in which there is clearance between said rolling elements and said non-rolling and lubricating spacer elements.

7. A bearing comprising:

means providing a raceway defined by circular inner and outer races;

a plurality of rolling elements in said raceway, said rolling elements being generally barrel-shaped and each having a race-engaging central portion;

non-rolling spacer elements in said raceway between said rolling elements for maintaining a predetermined minimum spacer therebetween;

and lubricating spacer elements in said raceway between said rolling elements, said lubricating elements being free to float independently of said rolling elements and non-rolling spacer elements, said lubricating spacer elements being located between said central portions of the rolling elements to apply lubricant thereto, and said non-rolling spacer elements being located endwise of said lubricating spacer elements.

8. A bearing according to claim 7 in which said non-rolling spacer elements are portions of a cage having end rings located endwise of the ends of said rolling elements.

9. A bearing comprising:

means providing a circular raceway;

a plurality of rolling elements in said raceway;

non-rolling spacer elements in said raceway between said rolling elements for maintaining a predetermined minimum spacing therebetween;

and lubricating spacer elements in said raceway between said rolling elements, said lubricating elements being free to float independently of said rolling elements and non-rolling spacer elements, the rolling elements alternating with said lubricating spacer elements at a central portion of the rolling elements, and the rolling elements alternating with said non-rolling spacer elements endwise of said central portion and lubricating spacer elements.

10. A bearing comprising:

means providing a circular raceway;

a plurality of rolling elements in said raceway;

non-rolling spacer elements in said raceway between said rolling elements for maintaining a predetermined minimum spacing therebetween;

and lubricating spacer elements in said raceway between said rolling elements, said lubricating elements being free to float independently of said rolling elements and non-rolling spacer elements, each roller element being arranged to engage at least three non-rolling spacer elements and at least two lubricating spacer elements.

11. A bearing comprising:

means providing a raceway;

a plurality of rollers in said raceway, non-roling spacer elements in said raceway between said rollers and opposite only a portion of the length of said rollers for maintaining alignment of the rollers; and floating roller lubricating elements in said raceway between said rollers and opposite a portion of the length of said rollers which is different from said first-mentioned portion, said roller lubricating elements containing substantially more lubricating material than said non-rolling spacer elements.

12. A bearing comprising:

rollers; and floating spacers separating the rollers, said spacers each comprising lubricating spacer elements and non-lubricating spacer elements placed end-to-end in alternating order, there being a total of at least three spacer elements in each spacer, and the alternating order of lubricating and non-lubricating elements in each spacer being staggered relative to such alternating order in the two adjacent spacers so that each roller has lubricating spacer elements from its two adjoining spacers collectively in sufficient contact along the length thereof as to provide lubrication for substantially the full length thereof.

13. A bearing according to claim 12 in which each lubricating spacer element in each spacer adjoins one or two non-lubricating spacer elements in such spacer.

* * * * *

UNITED STATES PATENT AND TRADEMARK OFFICE
CERTIFICATE OF CORRECTION

PATENT NO. : 5,149,208
DATED : September 22, 1992
INVENTOR(S) : David A. Zornes

It is certified that error appears in the above-indentified patent and that said Letters Patent is hereby corrected as shown below:

In column 5, claim 1, line 6, please insert --primarily of a non-lubricating composition and being-- between "being" and "arranged".

In column 6, claim 11, line 30, please delete "roling" and substitute therefor --rolling--.

Signed and Sealed this

Nineteenth Day of October, 1993

Attest:

BRUCE LEHMAN

Attesting Officer          Commissioner of Patents and Trademarks